United States Patent [19]

Hallsen

[11] Patent Number: 4,938,398

[45] Date of Patent: Jul. 3, 1990

[54] TRUCK STORAGE BOX

[76] Inventor: James E. G. Hallsen, 3902 Tammy Ct., New Albany, Ind. 47150

[21] Appl. No.: 405,227

[22] Filed: Sep. 11, 1989

[51] Int. Cl.$^5$ .............................................. B60R 9/00
[52] U.S. Cl. .................................. 224/42.42; 224/316; 296/37.6
[58] Field of Search ............ 224/273, 315, 316, 42.42; 296/37.6, 37.7

[56] References Cited

U.S. PATENT DOCUMENTS

| | | | |
|---|---|---|---|
| 3,514,023 | 5/1970 | Russell et al. | 224/316 |
| 4,215,896 | 8/1980 | Drouin | 224/42.42 |
| 4,488,669 | 12/1984 | Waters | 224/273 |
| 4,506,870 | 3/1985 | Penn | 224/42.42 |
| 4,531,774 | 7/1985 | Whatley | 296/37.6 |
| 4,635,992 | 1/1987 | Hamilton et al. | 296/37.6 |
| 4,674,665 | 6/1987 | Van Kirk | 224/273 |
| 4,770,330 | 9/1988 | Bonstead et al. | 224/42.42 |

*Primary Examiner*—Renee S. Luebke
*Attorney, Agent, or Firm*—Jerry T. Kearns

[57] ABSTRACT

A storage box adapted for mounting behind the wheel wells and the tailgate in a pick-up truck bed includes a planar base extending between bottom edges of a pair of generally vertical side walls. Each of the side walls have intersecting obliquely inclined top edge portions. A front wall of the storage box is formed by a rectangular planar panel extending in an obliquely inclined orientation between the top edge portions of the vertical side walls. A cover is formed by a planar rectangular panel which is pivotally secured to an upper edge of the front wall and is dimensioned to abut the top edge portions of the vertical side walls when in a closed position. A rear end opening of the storage box is defined by the planar base, the vertical side walls and the cover. The rear end opening is dimensioned to be opened and closed by the existing vehicle tailgate. A removable rear end panel may be inserted in aligned vertical guide tracks secured on opposite interior surfaces of the vertical side walls to close the rear end opening. The cover includes a locking mechanism to secure the cover in a closed position, covering the guide tracks to prevent removal of the rear end panel. The inclined front wall and cover forms an air foil to direct air flow smoothly over the vehicle tailgate to improve gas mileage.

10 Claims, 3 Drawing Sheets

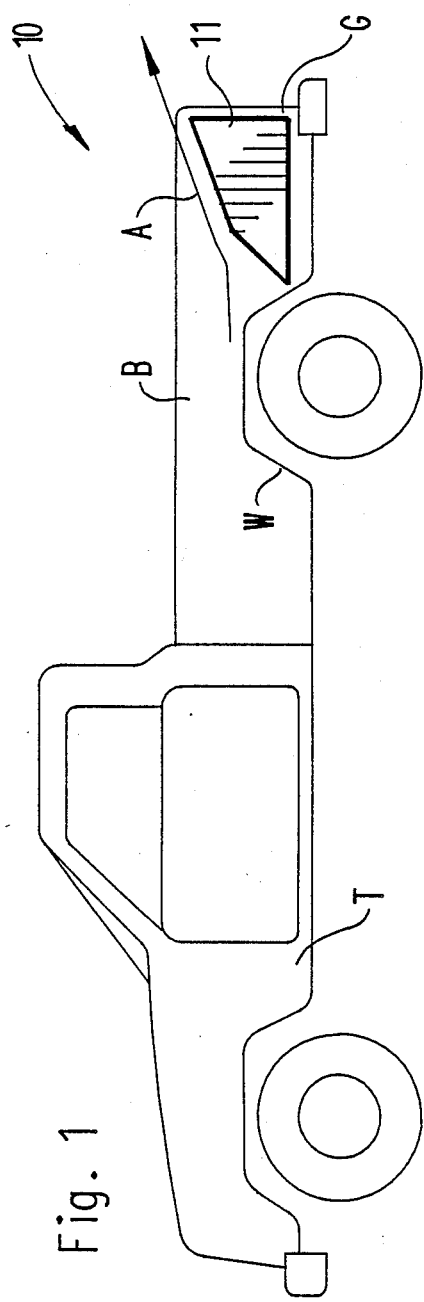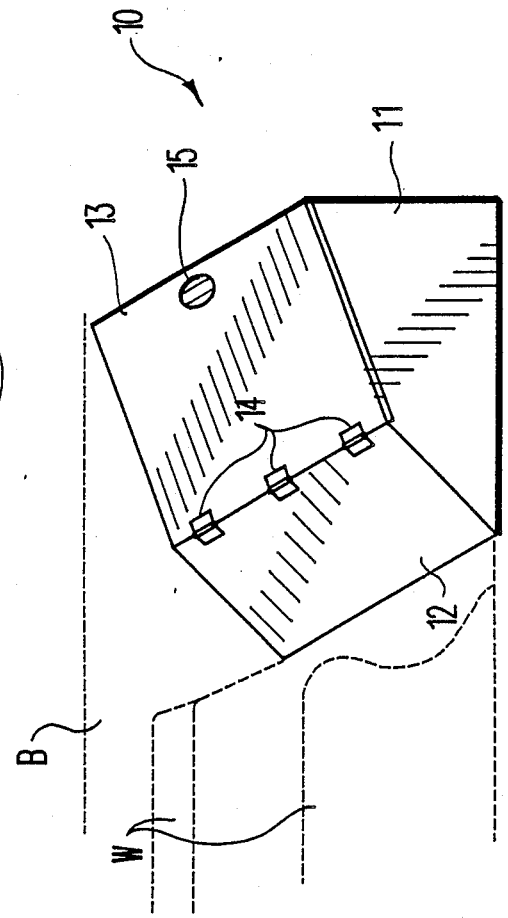
Fig. 1
Fig. 2

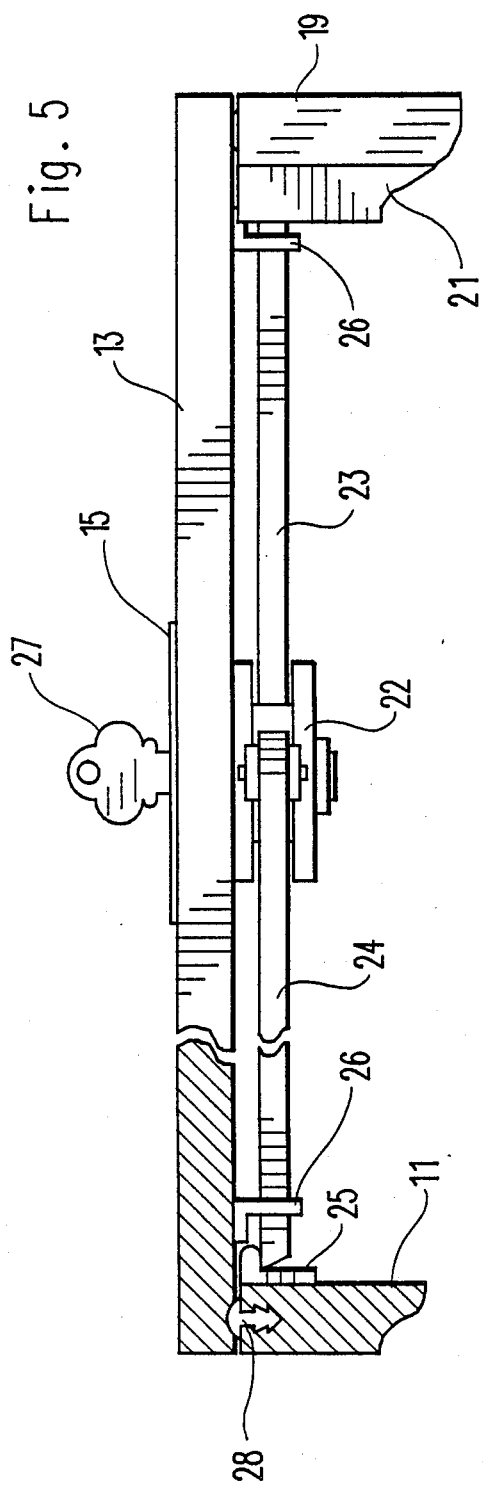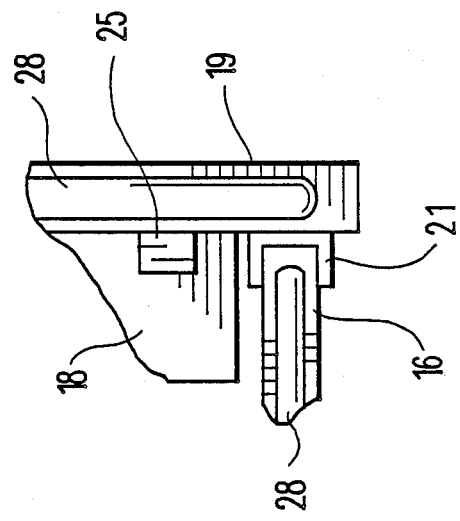

TRUCK STORAGE BOX

BACKGROUND OF THE INVENTION

1. Field of the Invention

The present invention relates to storage boxes, and more particularly pertains to a new and improved storage box adapted for mounting in the bed of a pick-up truck. Pick-up trucks have a planar vertically disposed tailgate which is mounted for pivotal movement to open and close a rear end opening defined by the floor and side walls of the pick-up truck bed. As it is well known, the vertical planar tailgate surface forms a barrier to smooth air flow when the truck is in motion. Additionally, the open truck bed does not provide a secure storage area to protect valuable items from weather damage and from theft. A variety of conventional storage boxes have been proposed to overcome this problem. However, none of the heretofore proposed storage receptacles overcome the problem of tailgate wind resistance. In order to overcome these problems, the present invention provides an improved storage box adapted for mounting behind the wheel wells and tailgate of a conventional pick-up truck and including front wall and cover surfaces which form an air foil to smoothly direct air flow over the vehicle tailgate.

2. Description of the Prior Art

Various types of vehicle truck boxes are known in the prior art. A typical example of such a storage box is to be found in U.S. Pat. No. 4,488,669, which issued to J. Waters on Dec. 18, 1984. This patent discloses a molded plastic storage box unitarily constructed of linear high density of polyethylene which is adapted for mounting immediately behind a pick-up truck cab. U.S. Pat. No. 4,531,774, which issued to G. Whatley on July 30, 1985, discloses an elongated rectangular storage box adapted for mounting above and between opposite side walls of a pick-up truck bed. U.S. Pat. No. 4,635,992, which issued to G. Hamilton et al on Jan. 13, 1987, discloses a storage box suspended on side rails between side walls within a pick-up truck bed allowing movement of the storage box longitudinally along the truck bed. U.S. Pat. No. 4,674,665, which issued to L. Van Kirk on June 23, 1987, discloses a tool box supported by the bed of a pick-up truck including a pivoting lid to allow access to the tools and a side located drip rail channel to prevent entry of moisture into the tool box interior. U.S. Pat. No. 4,770,330, which issued to D. Bonstead et al on Sept. 13, 1988, discloses a tool box including a plurality of compartments adapted for disassembly for convenient storage and shipment. The box is adapted for mounting behind the cab of a pick-up truck, between the truck bed side walls.

While the above mentioned devices are directed to truck storage boxes, none of these devices disclose a storage box which defines an air flow to direct air flow smoothly over a pick-up truck tailgate. Additionally, none of the aforementioned patents disclose a storage box defining a rear end opening adapted to be opened and closed by an existing pick-up truck tailgate. Additional features of the present invention not contemplated by the aforementioned prior art devices, include the provision of a storage box having a planar base dimensioned to be received behind the wheel wells and the tailgate of a conventional pick-up truck, the use of obliquely inclined intersecting front wall and cover portions to form an air foil, and the provision of a removable rear end panel. Inasmuch as the art is relatively crowded with respect to these various types of storage boxes, it can be appreciated that there is a continuing need for and interest in improvements to such storage boxes, and in this respect, the present invention addresses this need and interest.

SUMMARY OF THE INVENTION

In view of the foregoing disadvantages inherent in the known types of storage boxes now present in the prior art, the present invention provides an improved truck storage box. As such, the general purpose of the present invention, which will be described subsequently in greater detail, is to provide a new and improved truck storage box which has all the advantages of the prior art storage boxes and none of the disadvantages.

To attain this, a representative embodiment of the concepts of the present invention is illustrated in the drawings and makes use of a storage box, adapted for mounting behind the wheel wells and the tailgate in a pick-up truck bed, including a planar base extending between bottom edges of a pair of generally vertical side walls. Each of the side walls have intersecting obliquely inclined top edge portions. A front wall of the storage box is formed by a rectangular planar panel extending in an obliquely inclined orientation between the top edge portions of the vertical side walls. A cover is formed by a planar rectangular panel which is pivotally secured to an upper edge of the front wall and is dimensioned to abut the top edge portions of the vertical side walls when in a closed position. A rear end opening of the storage box is defined by the planar base, the vertical side walls and the cover. The rear end opening is dimensioned to be opened and closed by the existing vehicle tailgate. A removable rear end panel may be inserted in aligned vertical guide tracks secured on opposite interior surfaces of the vertical side walls to close the rear end opening. The cover includes a locking mechanism to secure the cover in a closed position, covering the guide tracks to prevent removal of the rear end panel. The inclined front wall and cover form an air foil to direct air flow smoothly over the vehicle tailgate to improve gas mileage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck storage box which has all the advantages of the prior art storage boxes and none of the disadvantages.

It is another object of the present invention to provide a new and improved truck storage box which may be easily and efficiently manufactured and marketed.

It is a further object of the present invention to provide a new and improved truck storage box which is of a durable and reliable construction.

An even further object of the present invention is to provide a new and improved truck storage box which is susceptible of a low cost of manufacture with regard to both materials and labor, and which accordingly is then susceptible of low prices of sale to the consuming public, thereby making such storage boxes economically available to the buying public.

Still yet another object of the present invention is to provide a new and improved truck storage box which provides in the apparatuses and methods of the prior art some of the advantages thereof, while simultaneously overcoming some of the disadvantages normally associated therewith.

Still another object of the present invention is to provide a new and improved truck storage box which forms an air foil to smoothly direct air flow over the tailgate of a pick-up tuck to improve gas mileage.

Yet another object of the present invention is to provide a new and improved truck storage box adapted for mounting behind the wheel wells and the tailgate of a pick-up truck bed to form an easily accessible storage box.

Even still another object of the present invention is to provide a new and improved truck storage box having a rear end opening adapted to be opened and closed by a conventional pick-up truck tailgate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view diagrammatically illustrating the storage box of the present invention installed in the bed of a conventional pick-up truck.

FIG. 2 is a perspective view, further illustrating the installed orientation of the storage box within a pick-up truck bed.

FIG. 5 is a detail view illustrating the locking mechanism for securing the cover of the storage box in a closed position.

FIG. 6 is a detail view which illustrates the guide track arrangement for removably retaining the rear end panel of the storage box.

DESCRIPTION OF THE PREFERRED EMBODIMENT

Figure 3:
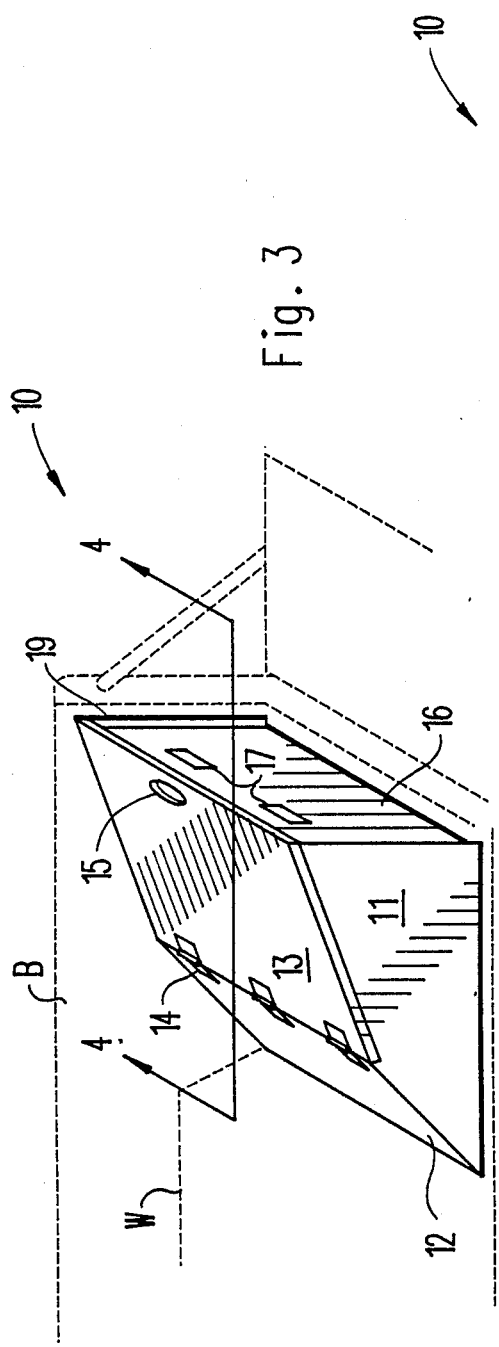
FIG. 3 is a perspective view illustrating the rear end portion of the storage box of the present invention, as installed within the bed of a conventional pick-up truck.

With reference now to the drawings, and in particular to FIG. 1 thereof, a new and improved truck storage box embodying the principles and concepts of the present invention and generally designated by the reference numeral 10 will be described.

More specifically, it will be noted that the first embodiment 10 of the invention includes a storage box having a generally vertical side wall 11. The storage box 10 is dimensioned to be mounted in the bed B of a conventional pick-up truck T, behind the wheel wells W, near the tailgate G of the truck T. The box 10 has two intersecting obliquely inclined surfaces which form an air foil to direct air flow smoothly over the tailgate G, as indicated by arrow A.

FIG. 2 is a perspective view which diagrammatically illustrates the upwardly extending wheel wells W within the bed B of the pick-up truck. The storage box 10 includes generally vertical spaced parallel side walls, one of which is illustrated at 11. A top edge portion of each of the vertical side walls 11 is formed by two intersecting obliquely inclined surfaces. A front wall 12 of the box 10 is formed by a rectangular planar panel secured between the top edge portions of the side walls 11. A planar rectangular panel 13 forms a pivotal cover which is secured to a top edge of the front wall 12 by a plurality of hinges 14. A latching mechanism 15 is provided for securing the cover 13 in a closed position.

FIG. 3 is an additional perspective view which illustrates a removable rear end panel 16 mounted between the vertical side walls 11 and 19 of the box 10. The panel 16 includes a pair of hand-grip depressions or cut-outs 17 to facilitate installation and removal. As illustrated, the box 10 has a rear end opening covered by the panel 16. When the panel 16 is removed, the rear end opening is dimensioned to be opened and closed by the existing tailgate G.

Figure 4:
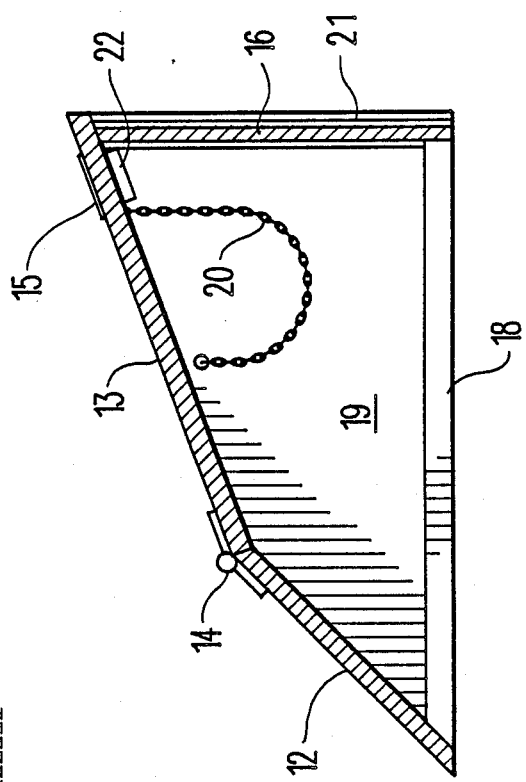
FIG. 4 is a transverse cross sectional view, taken along line 4—4 of FIG. 3.

FIG. 4 is a transverse cross sectional view which illustrates an optional retaining chain 20 secured between the vertical side wall 19 and the interior surface of the cover 13. The chain 20 serves to prevent the cover 13 from being opened beyond the limits of the hinge 14 and also serves to allow a user to close the cover 13 by pulling on the chain 20 when standing adjacent the tailgate of the truck. The removable rear end panel 16 is mounted between the vertical side walls 19 and 11 (not shown) by a pair of aligned vertical guide tracks 21. The box 10 includes a planar base 18 which is secured between the vertical side walls 19 and 11 and the lower edge of the front wall 12.

FIG. 5 is a detail view, partiallY in cross section, which illustrates the cover 13 disposed in a closed position in abutment with the top edge portions of the vertical side walls 11 and 19. The aligned guide track members 21 are disposed in parallel aligned relation on each of the vertical side walls 11 and 19, and are adapted to removably receive the rear end panel 16 (FIG. 4). The guide track member 21 has been cut away from the side wall 11 to allow illustration of the details of the locking mechanism. Resilient weather stripping members 28 may be provided on the top edge portions of the side walls 11 and 19 to provide a weather sealing surface for abutment with the cover 13. The locking mechanism includes a reciprocal rotary handle 15 having a conventional locking mechanism adapted for actuation by a key 27. Locking bars 23 and 24 extend for limited longitudinal sliding movements through guide members 26 secured on the inner surface of the cover 13. End portions of the locking bars 23 and 24 cooperate with right angle flanged latch members 25 secured on the vertical side walls 11 and 19. As illustrated, the cover 13 covers the top end of the guide channel 21 which prevents removal of the rear end panel (FIG. 4) when the cover 13 is in a closed position and secured by the locking mechanism 15. This provides a secure relatively theft proof storage receptacle for storing valuable items.

FIG. 6 is a top detail view which illustrates the latching member 25 secured to the side wall 19 and the base 18 of the storage box. The rear end panel 16 is removably received within the guide track 21 and weather stripping members 28 are provided on the top edges of the panel 16 and side wall 19 to provide a weather proof storage box.

The storage box 10 of the present invention maY be mounted within the bed of a conventional pick-up truck by the use of bolts or self tapping screws installed through the floor of the truck bed. The storage box forms a "trunk" which allows convenient access through the vehicle tailgate. In tests, the air foil construction of the storage box provides approximately ten percent increase in gas mileage as compared to a pick-up truck without a storage box driven with the tailgate in a closed position. Additionally, the position of the storage box in the rear portion of the bed allows items to be retained for convenient access adjacent the tailgate. In conventional pick-up trucks without a storage box, items tend to slide forwardly adjacent the pick-up truck cab. In addition to functioning as a storage box, the device may be utilized as a receptacle to receive sand, gravel, blocks, stones or other dense material to increase vehicle traction by positioning additional weight behind the rear axle. If loose sand is utilized, it may be conveniently distributed on a slippery road surface adjacent the rear wheels of the vehicle by opening the tailgate and shoveling out the required amount of loose sand. When hauling long items such as lumber or plywood, the forward end will butt against the vehicle cab and the rear end of the items will be supported on the inclined surface of the cover 13. This prevents elongated items from sliding out of the truck bed. In conventional pick-up trucks operated with the tailgate in a horizontal open position to transport long items, there is a tendencY for the items to slide rearwardly out of the bed. The storage box 10 of the present invention is preferably formed from a high strength plastic or reinforced fiberglass material, but may be formed from sheet metal or plywood without departing from the scope of the present invention. It is contemplated that the storage box 10 may be packaged and marketed in a disassembled kit form to allow smaller and less expensive shipping and packaging.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck storage box for mounting in a pick-up truck bed having a pair of spaced parallel vertical side walls connected by a horizontal floor, a tail gate pivotally mounted on a rear end portion of the truck be for movement between open and closed positions, and a pair of wheel wells extending upwardly through the floor at a predetermined distance forwardly of the tailgate, said storage box comprising:
   a pair of generally vertical side walls;
   a planar generally horizontal base connecting said generally vertical side walls;
   an aerodynamically configured front wall connecting said base and said vertical side walls;
   an aerodynamically configured cover mounted for movement between open and closed position; and
   a rear panel removably mounted in a rear opening formed between said generally vertical side walls.

2. The truck storage box of claim 1, further comprising a pair of aligned generally vertical guide tracks on interior surfaces of said generally vertical side walls removably receiving edge portions of said rear panel.

3. The truck storage box of claim 1, further comprising latch means for securing said cover in a closed position.

4. The truck storage box of claim 1, wherein each of said generally vertical side walls have intersecting obliquely inclined top edge portions, said front wall and said cover comprising two obliquely inclined intersecting planar panels extending between said inclined top edge portions of said generally vertical side walls.

5. The truck storage box of claim 4, wherein said cover is pivotally connected to said front wall.

6. The truck storage box of claim 1, wherein said planar base is dimensioned to extend behind the wheel wells and the tailgate of a pick-up truck bed.

7. The truck storage box of claim 6, wherein said storage box rear opening faces the rear end portion of the truck bed, and said rear opening is dimensioned to be closed by the tailgate.

8. A truck storage box adapted for mounting in a pick-up truck bed having a pair of spaced parallel vertical side walls connected by a horizontal floor, a tail gate pivotally mounted on a rear end portion of the truck bed for movement between open and closed positions, and a pair of wheel wells extending upwardly through the floor at a predetermined distance forwardly of the tailgate, said storage box comprising:
- a pair of generally vertical side walls each having obliquely inclined intersecting top edge portions;
- a generally horizontal planar base connecting bottom edges of said generally vertical side walls, said base dimensioned to extend behind the wheel wells and the tailgate within a pick-up truck bed;
- a front wall formed from a planar panel mounted in an obliquely inclined orientation between said generally vertical side wall top edge portions;
- a cover formed by a planar panel pivotally secured to a top edge of said front wall and dimensioned for abutment in a closed position with said top edge portions of said generally vertical side walls, said front wall and said cover forming an air foil for directing air over the pick-up truck tailgate when said cover is in a closed position;
- a pair of generally vertical guide tracks extending in aligned orientation on interior surfaces of said generally vertical side walls; and
- a removable rear end panel having opposite side edges removably received in said guide tracks.

9. The truck storage box of claim 8, wherein said cover is dimensioned to cover top ends of said guide tracks when in a closed position to prevent removal of said rear end panel.

10. The truck storage box of claim 9, further comprising latch means for locking said cover in said closed position.

* * * * *